US011714482B2

(12) United States Patent
Zhou et al.

(10) Patent No.: US 11,714,482 B2
(45) Date of Patent: Aug. 1, 2023

(54) DEPTH INFORMATION BASED POSE DETERMINATION FOR MOBILE PLATFORMS, AND ASSOCIATED SYSTEMS AND METHODS

(71) Applicant: SZ DJI TECHNOLOGY CO., LTD., Shenzhen (CN)

(72) Inventors: You Zhou, Shenzhen (CN); Jie Liu, Shenzhen (CN); Zhenyu Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 205 days.

(21) Appl. No.: 16/896,979

(22) Filed: Jun. 9, 2020

(65) Prior Publication Data
US 2020/0304775 A1 Sep. 24, 2020

Related U.S. Application Data

(63) Continuation of application No. PCT/CN2017/115893, filed on Dec. 13, 2017.

(51) Int. Cl.
*G06V 10/00* (2022.01)
*G06F 3/01* (2006.01)
(Continued)

(52) U.S. Cl.
CPC .............. *G06F 3/011* (2013.01); *G06T 7/521* (2017.01); *G06T 7/593* (2017.01); *G06V 10/426* (2022.01);
(Continued)

(58) Field of Classification Search
CPC .......... H04N 13/271; H04N 2013/0081; G06T 7/521; G06T 7/593; G06V 10/426;
(Continued)

(56) References Cited

U.S. PATENT DOCUMENTS

2011/0081045 A1* 4/2011 Lee .................. G06T 7/251
382/103
2011/0289456 A1* 11/2011 Reville ............... G06F 3/017
715/830

(Continued)

FOREIGN PATENT DOCUMENTS

| CN | 102520794 A | 6/2012 |
| CN | 106774850 A | 5/2017 |
| WO | 2017143588 A1 | 8/2017 |

OTHER PUBLICATIONS

The World Intellectual Property Organization (WIPO) International Search Report and Written Opinion for PCT/CN2017/115893 dated Sep. 4, 2018 6 pages.

*Primary Examiner* — Sean M Conner
*Assistant Examiner* — Denise G Alfonso
(74) *Attorney, Agent, or Firm* — Anova Law Group, PLLC

(57) ABSTRACT

A pose determination method for a subject includes identifying a plurality of candidate regions from depth data representing an environment based on a depth connectivity criterion, determining a first region including a first subset of the plurality of candidate regions based on an estimation regarding a first pose component of the subject, determining a second region including a second subset of the plurality of candidate regions that are disconnected from the first subset of the plurality of candidate regions based on relative locations of the first region and the second region, generating a collective region by associating the first region with the second region, identifying the first pose component and a second pose component of the subject from the collective region, determining a spatial relationship between the first pose component and the second pose component, and generating a controlling command based on the spatial relationship.

19 Claims, 7 Drawing Sheets

(51) Int. Cl.
  *G06T 7/521* (2017.01)
  *G06T 7/593* (2017.01)
  *H04N 13/271* (2018.01)
  *G06V 10/426* (2022.01)
  *G06V 20/64* (2022.01)
  *G06V 40/10* (2022.01)
  *H04N 13/00* (2018.01)

(52) U.S. Cl.
  CPC ............ *G06V 20/64* (2022.01); *G06V 40/103* (2022.01); *H04N 13/271* (2018.05); *H04N 2013/0081* (2013.01)

(58) Field of Classification Search
  CPC ...... G06V 40/103; G06V 20/64; G06F 3/011; G06F 3/017; G06F 3/0304
  See application file for complete search history.

(56) References Cited

U.S. PATENT DOCUMENTS

| | | | |
|---|---|---|---|
| 2013/0249786 A1 | 9/2013 | Wang | |
| 2013/0329011 A1* | 12/2013 | Lee | G06F 3/011 |
| | | | 348/46 |
| 2014/0056471 A1* | 2/2014 | Gu | G06K 9/6242 |
| | | | 382/103 |
| 2014/0267031 A1 | 9/2014 | Huebner | |
| 2015/0002419 A1 | 1/2015 | White et al. | |
| 2016/0127710 A1* | 5/2016 | Saban | H04N 5/2624 |
| | | | 386/241 |
| 2016/0267699 A1 | 9/2016 | Borke et al. | |
| 2017/0351253 A1* | 12/2017 | Yang | G06V 40/20 |
| 2019/0138106 A1* | 5/2019 | Murakami | G06T 7/73 |

\* cited by examiner

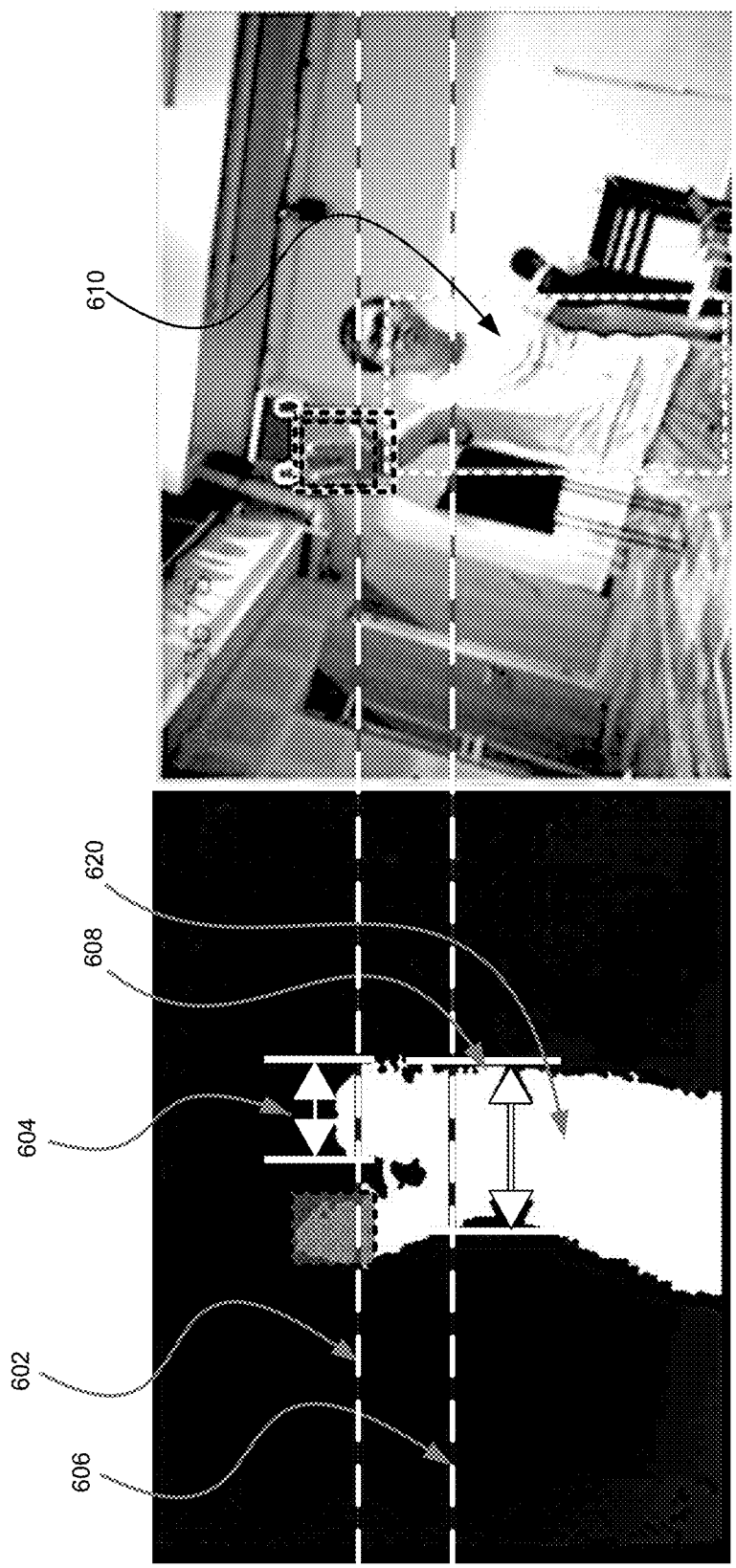

DEPTH INFORMATION BASED POSE DETERMINATION FOR MOBILE PLATFORMS, AND ASSOCIATED SYSTEMS AND METHODS

CROSS-REFERENCE TO RELATED APPLICATION

This application is a continuation of International Application No. PCT/CN2017/115893, filed Dec. 13, 2017, the entire content of which is incorporated herein by reference.

TECHNICAL FIELD

The present technology is generally directed to determining the pose or gesture of one or more subjects, such as one or more human users in a three-dimensional (3D) environment adjacent to a mobile platform.

BACKGROUND

The environment surrounding a mobile platform can typically be scanned or otherwise detected using one or more sensors. For example, the mobile platform can be equipped with a stereo vision system (e.g., a "stereo camera") to sense its surrounding environment. A stereo camera is typically a type of camera with two or more lenses each having a separate image sensor or film frame. When taking photos/videos with the two or more lenses at the same time but from different angles, the difference between the corresponding photos/videos provides a basis for calculating depth information (e.g., distance from objects in the scene to the stereo camera). As another example, the mobile platform can be equipped with one or more LiDAR sensors, which typically transmit a pulsed signal (e.g. laser signal) outwards, detect the pulsed signal reflections, and determine depth information about the environment to facilitate object detection and/or recognition. However, inaccuracies exist in different depth-sensing technologies, which can affect various higher level applications such as pose and/or gesture determination.

SUMMARY

The following summary is provided for the convenience of the reader and identifies several representative embodiments of the disclosed technology.

In some embodiments, a computer-implemented method for determining a pose of a subject within an environment includes identifying a plurality of candidate regions from base depth data representing the environment based, at least in part, on at least one depth connectivity criterion, determining a first region from a subset of the candidate regions as corresponding to a first pose component of the subject, and selecting one or more second regions from the subset of candidate regions to associate with the first region based, at least in part, on relative locations of the first region and the one or more second regions. The method also includes identifying the first pose component and at least one second pose component of the subject from a collective region including the first region and the one or more associated second regions, determining a spatial relationship between the identified first pose component and the identified at least one second pose component, and causing generation of a controlling command for execution by a mobile platform based, at least in part, on the determined spatial relationship.

In some embodiments, the base depth data is generated based, at least in part, on images captured by at least one stereo camera. In some embodiments, the base depth data includes a depth map calculated based, at least in part, on a disparity map and intrinsic parameters of the at least one stereo camera. In some embodiments, the method further comprises determining a depth range where the subject is likely to appear in the base depth data. In some embodiments, the plurality of candidate regions are identified within the range of depth. In some embodiments, the base depth data includes at least one of unknown, invalid, or inaccurate depth information.

In some embodiments, the at least one depth connectivity criterion includes at least one of a depth threshold or a change-of-depth threshold. In some embodiments, two or more of candidate regions are disconnected from one another due, at least in part, to unknown, invalid, or inaccurate depth information in the base depth data. In some embodiments, the method further comprises selecting the subset of the candidate regions based, at least in part, on first baseline information regarding at least one pose component of the subject. In some embodiments, the first baseline information indicates an estimated size of the at least one pose component. In some embodiments, the first baseline information is based, at least in part, on prior depth data.

In some embodiments, determining the first region is based, at least in part, on second baseline information regarding the first pose component of the subject. In some embodiments, the second baseline information indicates an estimated location of the first pose component. In some embodiments, the second baseline information is based, at least in part, on prior depth data. In some embodiments, selecting one or more second regions from the subset of candidate regions to associate with the first region is based, at least in part, on non-depth information regarding the environment. In some embodiments, the non-depth information includes two-dimensional image data that corresponds to the base depth data.

In some embodiments, selecting the one or more second regions to associate with the first region comprises distinguishing candidate regions potentially corresponding to the subject from candidate regions potentially corresponding to at least one other subject. In some embodiments, selecting one or more second regions from the subset of candidate regions to associate with the first region is based, at least in part, on estimated locations of a plurality of joints of the subject. In some embodiments, selecting one or more second regions from the subset of candidate regions to associate with the first region at least partially discounts an effect of unknown, invalid, or inaccurate depth information in the base depth data.

In some embodiments, the subject is a human being. In some embodiments, the first pose component and the at least one second pose component are body parts of the subject. In some embodiments, the first pose component is a torso of the subject and the at least one second pose component is a hand of the subject. In some embodiments, identifying the first pose component and at least one second pose component of the subject comprises detecting a portion of the collective region based, at least in part, on a measurement of depth. In some embodiments, detecting a portion of the collective region comprises detecting a portion closest in depth to the mobile platform. In some embodiments, identifying the at least one second pose component is based, at least in part, on a location of the detected portion relative to a grid system.

In some embodiments, identifying the at least one second pose component comprises identifying at least two second pose components. In some embodiments, identifying the first pose component comprises removing the identified at least one second pose component from the collective region. In some embodiments, identifying the first pose component is based, at least in part, on a threshold on width.

In some embodiments, determining a spatial relationship between the identified first pose component and the identified at least one second pose component comprises determining one or more geometric attributes of the first and/or second pose components. In some embodiments, the one or more geometric attributes include a location of centroid. In some embodiments, determining a spatial relationship between the identified first pose component and the identified at least one second pose component comprises determining comprises determining one or more vectors pointing between portions of the first pose component and the at least one second pose component.

In some embodiments, the mobile platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display. In some embodiments, the method further comprises controlling a mobility function of the mobile platform based, at least in part, on the controlling command.

Any of the foregoing methods can be implemented via a non-transitory computer-readable medium storing computer-executable instructions that, when executed, cause one or more processors associated with a mobile platform to perform corresponding actions, or via a vehicle including a programmed controller that at least partially controls one or more motions of the vehicle and that includes one or more processors configured to perform corresponding actions.

BRIEF DESCRIPTION OF THE DRAWINGS

FIGS. 6A and 6B illustrate a process for identifying a primary pose component (e.g., torso) of the subject, in accordance with some embodiments of the presently disclosed technology.

DETAILED DESCRIPTION

1. Overview

Figure 1A:
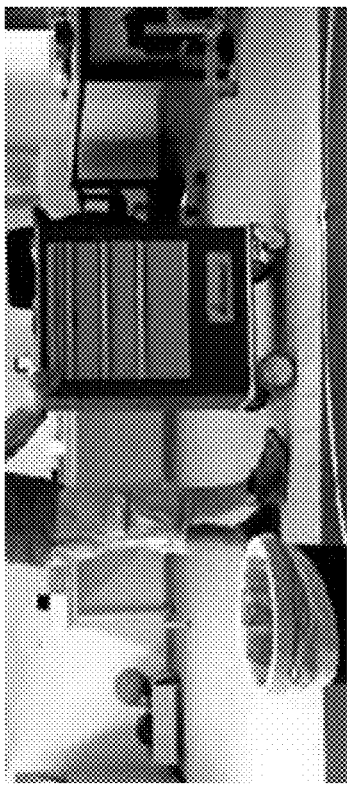
FIG. 1A is an illustrative 2D image of an environment in front of a mobile platform and FIG. 1B is an illustrative depth map corresponding to the 2D image of FIG. 1A, in accordance with some embodiments of the presently disclosed technology.

Poses or gestures are natural communication modes for human users, which provide a promising direction for a human-computer interface applicable to various mobile platforms. However, it can be technologically difficult and computationally intensive to determine the pose or gesture of subject(s) based on two-dimensional (2D) image information, and any resulting distance information may not be accurate. Depth information (e.g., provided by stereo camera, LiDAR, and/or other sensors) provides measurements in another dimension, which can be used to improve the efficiency and/or efficacy of pose determination. However, inaccuracies or other imperfections in the depth information may occur for various reasons. For example, a stereo camera may not be able to provide depth information for a textureless subject, some part(s) of the environment may be overexposed or underexposed, and certain shapes, orientations or colocations of objects may cause imperfect depth detection.

The presently disclosed technology uses a region-based method to discount or eliminate the negative effect of imperfections in depth information, identify pose components of one or more subjects, and determine spatial relationships among the pose components for generating various controlling commands based thereon. An illustrative method can include analyzing depth information (e.g., including identifying depth inaccuracies or other imperfections) and determining candidate regions which potentially includes at least a portion of a pose component (e.g., torso, hand, or the like). The candidate regions can be determined based on various criteria of depth-discontinuity, some of which may be caused by the depth inaccuracies or other imperfections. The illustrative method can include generating a collective region by grouping together a subset of the candidate regions based on their spatial or logical relationship, thereby "reconnecting" certain candidate regions that were separated due to the depth inaccuracies or imperfections. The collective region can be further analyzed for identifying one or more pose components therein.

Several details describing structures and/or processes that are well-known and often associated with mobile platforms (e.g., UAVs or other types of movable platforms) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1A-8.

FIGS. 1A-8 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding scanning platform. For example, the programmable computer or controller can be an onboard computer of the mobile platform, or a separate but dedicated computer associated with the mobile platform, or part of a network or cloud based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium. In particular embodiments, the instructions are accordingly non-transitory.

2. Representative Embodiments

Figure 1B:
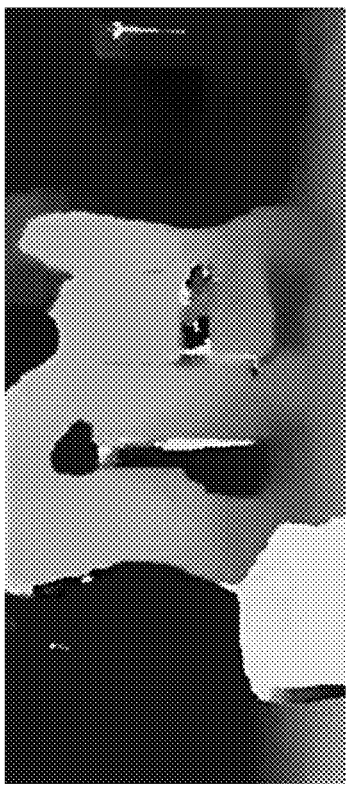

As discussed above, a stereo camera or other sensor can provide data for obtaining depth information (e.g., measurements of distance between different portions of a scene and the sensor) for an environment that surrounds or is otherwise adjacent to, but does not necessarily abut, a mobile platform. For example, FIG. 1A is an illustrative 2D image of an environment in front of a mobile platform and FIG. 1B is an illustrative depth map corresponding to the 2D image of FIG. 1A, in accordance with some embodiments of the presently disclosed technology. As shown in FIG. 1A, the environment includes a subject (e.g., a human user), various other objects, a floor, and walls. The depth map of FIG. 1B illustratively uses grayscale to represent the depth (e.g., distance to the mobile platform or the observing sensor) of different portions of the environment. For example, the darker a pixel appears in the depth map of FIG. 1B, the deeper (i.e., farther away) the portion of the environment corresponding to the pixel is located. In various embodiments, a depth map can be represented as a color graph, point cloud, or other forms.

Figure 2A:
FIG. 2A is an illustrative 2D image of a subject (e.g., human user)
Figure 2B:
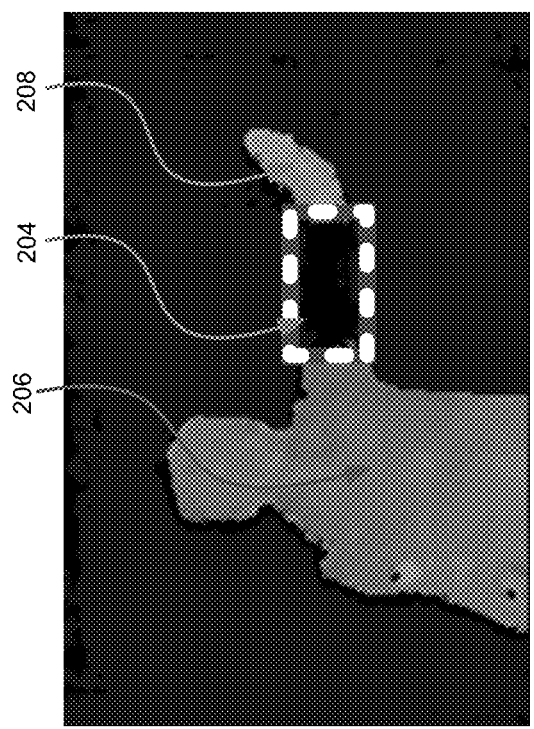
FIG. 2B is a corresponding depth map with defects, in accordance with some embodiments of the presently disclosed technology.

Various imperfections, such as inaccuracies, defects, and/or unknown or invalid values, can exist in the depth information about an environment. For example, FIG. 2A is an illustrative 2D image of a subject (e.g., human user) and FIG. 2B is a corresponding depth map with defects, in accordance with some embodiments of the presently disclosed technology. As can be seen, the subject in FIG. 2A is extending an arm to express a pose/gesture. A portion 202 of the extended arm lacks texture (e.g., appears mostly in white, without variance). In this case, the stereo camera generated depth map of FIG. 2B cannot accurately reflect the depth of the arm portion 202. Illustratively, in FIG. 2B, a region 204 that corresponds to the arm portion 202 includes unknown or invalid depth data, thereby incorrectly separating a torso portion 206 from a hand portion 208, both of which in fact belong to a same subject. A person of skill in the art can appreciate that various other forms of imperfections may exist in sensor-generated depth information about an environment.

Figure 3:
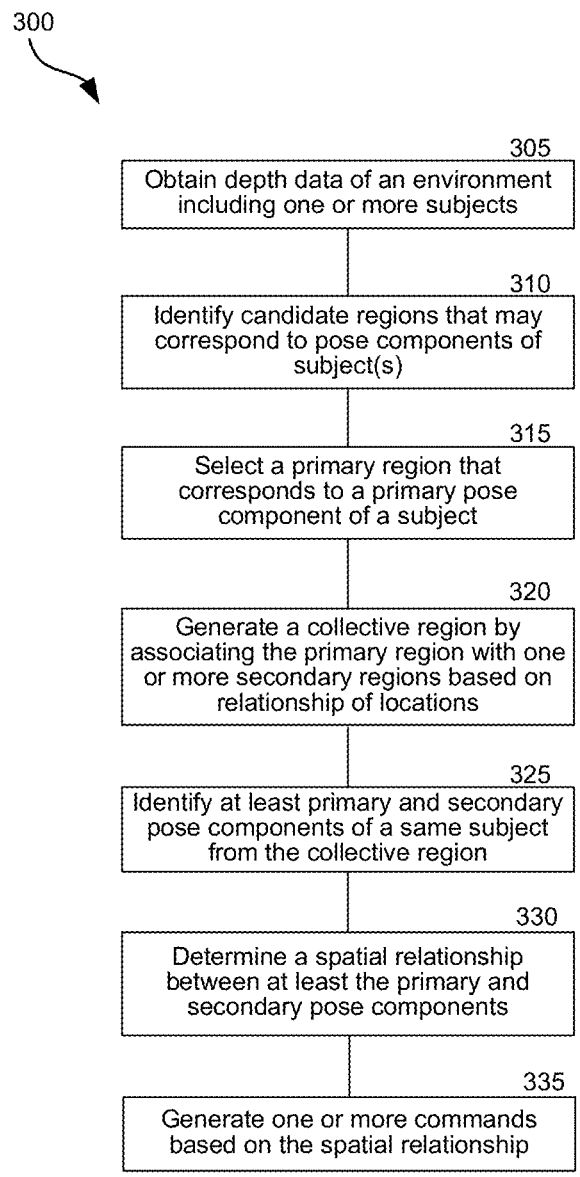
FIG. 3 is a flowchart illustrating a method for determining a pose or gesture of a subject, in accordance with some embodiments of the presently disclosed technology.

FIG. 3 is a flowchart illustrating a method 300 for determining a pose or gesture of a subject, despite imperfections, in accordance with some embodiments of the presently disclosed technology. The method can be implemented by a controller (e.g., an onboard computer of a mobile platform, an associated computing device, and/or an associated computing service). The method 300 can use various combinations of depth data, non-depth data, and/or baseline information at different stages to achieve pose/gesture determinations. As discussed above in paragraph [0023], the method 300 method can include analyzing depth information, determining candidate regions, as well as generating a collective region for identifying one or more pose components therein.

At block 305, the method includes obtaining depth data of an environment (e.g., adjacent to the mobile platform) including one or more subjects (e.g., human users). The depth data can be generated based on images captured by one or more stereo cameras, point clouds provided by one or more LiDAR sensors, and/or data produced by other sensors carried by the mobile platform. In the embodiments in which stereo camera(s) are used, the depth data can be represented as a series of time-sequenced depth maps that are calculated based on corresponding disparity maps and intrinsic parameters of the stereo camera(s). In some embodiments, median filters or other pre-processing operations can be applied to source data (e.g., disparity maps) before they are used as a basis for generating the depth data, in order to reduce noise or otherwise improve data quality.

In some embodiments, the method includes determining a depth range in which one or more subjects are likely to appear in the depth data corresponding to a particular time (e.g., a most recently generated frame of a depth map). Illustratively, the depth range can be determined based on baseline information derived from prior depth data (e.g., one or more frames of depth maps generated immediately prior to the most recent frame). The baseline information can include a depth location (e.g., 2 meters in front of the mobile platform) of a subject that was determined (e.g., using method 300 in a prior iteration) based on the prior depth data. The depth range (e.g., a range between 1.5 meters and 2.5 meters) can be set to cover the determined depth location with certain margins. In some embodiments, the baseline information can be defined independent of the existence of prior depth data. For example, an initial iteration of the method 300 can use a predefined depth range (e.g., a range between 1 meter and 3.5 meters in front of the mobile platform). The controller can generate a reference depth map (e.g., FIG. 2B) using only the depth information within the depth range. In some embodiments, the depth range determination is not performed and the reference depth map can include all or a subset of depth information corresponding to the particular time.

At block 310, the method includes identifying candidate regions that may correspond to pose components (e.g., the user's or other subject's torso, hand, or the like). Illustratively, the controller analyzes the reference depth map to identify all the regions that can be separated from one another based on one or more depth connectivity criteria (e.g., a depth threshold or a change-of-depth threshold). For example, each identified candidate region includes pixels that are connected to one another on the depth map. The pixels in each region do not vary in depth beyond a certain threshold. Each candidate region is disconnected from any other candidate regions in depth, and in some embodiments, also disconnected in one or two other dimensions. As discussed previously, in some cases, the disconnection is caused by unknown, invalid, or inaccurate depth information.

The controller can select a subset of the candidate regions based on baseline information regarding at least one pose component of the subject. The baseline information can indicate an estimated size of pose component(s) (e.g., size of a hand), based on prior depth data. Illustratively, the controller can estimate a quantity $n_{valid}$ of pixels on the reference depth map that correspond to an average size of a hand, using (1) the likely depth location (e.g., 2 meters in front of the mobile platform) of the subject as estimated at block 305 and (2) a previously determined relationship between a pixel quantity (e.g., 100 pixels) and an average hand size at a known depth location (e.g., 1 meter in front of the mobile platform). In this example, the estimated pixel quantity $n_{valid}$ can be 25 pixels based on operation of geometric transformations. In some embodiments, a margin (e.g., 20%) or other weighting factor can be applied to reduce the risk of false negatives, thus the estimated pixel quantity $n_{valid}$ can be further reduced, for example, to 20 pixels. Accordingly, potentially more candidate regions can be selected and included in the subset.

The estimated size of the pose component(s) can be used to filter the candidate regions to generate a more relevant subset for identifying pose component(s) in a more efficient manner. Illustratively, the controller compares the size (e.g., number of pixels) of each candidate region with a valid size range (e.g., between $n_{valid}$ and a multiple of $n_{valid}$) defined based on the estimated size, and filters out candidate regions having sizes that fall outside of the valid size range. In some embodiments, the valid size range can be determined based on estimated sizes of two or more pose components.

At block 315, the method includes selecting from the subset of candidate regions a primary region that potentially corresponds to a primary pose component (e.g., torso) of a subject. In some embodiments, the controller determines the primary region based on baseline information (e.g., location and/or size) regarding the primary pose component of the subject. Similarly, the baseline information used here can be derived from prior depth data (e.g., prior reference depth map(s) where the primary pose component was determined using method 300 in prior iteration(s)). For example, if the subject's torso was detected from a prior frame of depth information, the controller can determine a centroid point of the previously determined torso portion and map the centroid point to the current reference depth map. The controller can label a candidate region as the primary region if the centroid point lands inside the candidate region. Alternatively, the controller can select a primary region based on region size (e.g., selecting the largest candidate region within the subset as corresponding to the torso of the subject). It should be noted that the primary region may include a portion of the primary pose component, multiple pose components, non-pose components (e.g., head of a human user in some cases) of the subject, and/or objects other than the subject.

Figure 4B:
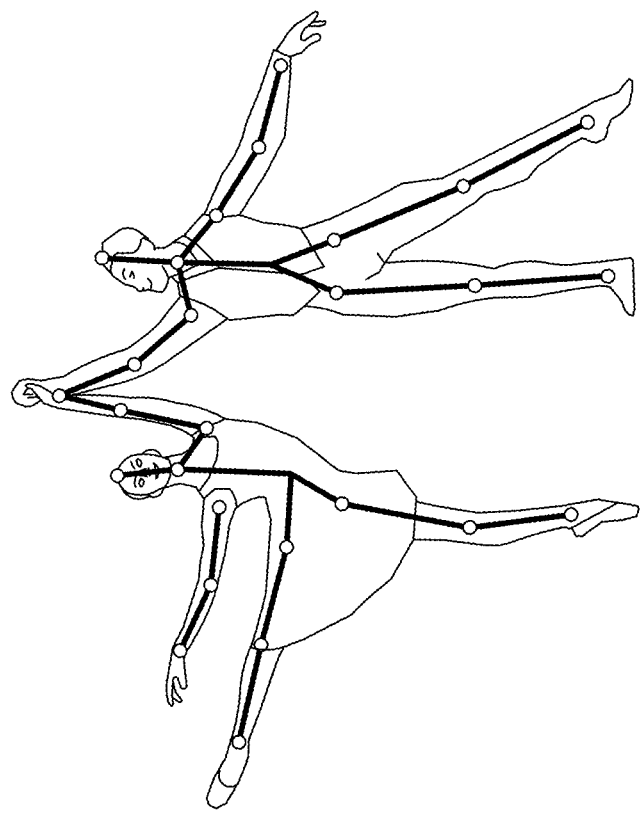
FIG. 4B illustrates subject features (e.g. joints) determined from the 2D image, as well as the grouping and mapping of the subject features to individual subjects, in accordance with some embodiments of the presently disclosed technology.
Figure 4A:
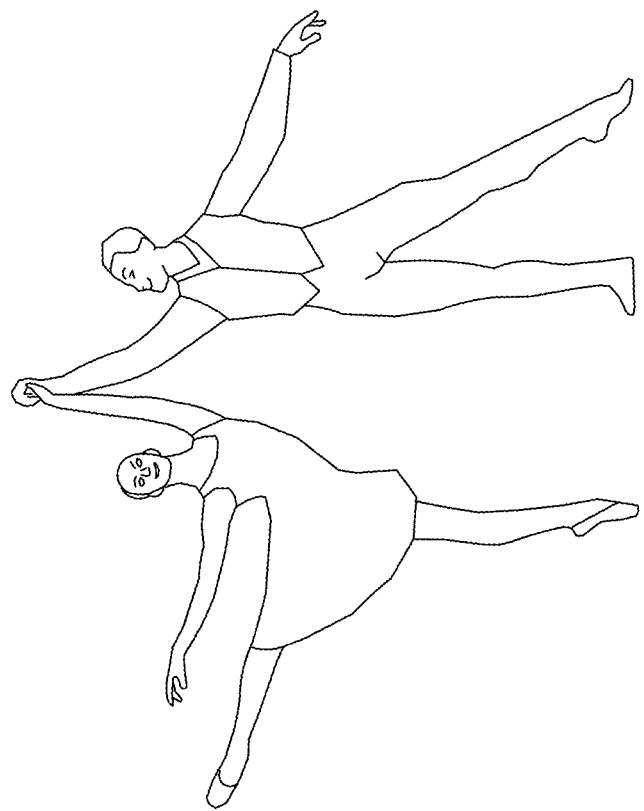
FIG. 4A illustrates a 2D image of multiple subjects (e.g., two human dancers)

At block 320, the method includes generating a collective region by associating the primary region with one or more secondary regions of the subset based on their relative locations. In some embodiments, this can be achieved based on the analysis of non-depth information regarding the environment. As discussed previously, candidate regions can be disconnected from one another due to unknown, invalid, or inaccurate depth information. Non-depth information (e.g., corresponding 2D image(s) of the environment) can be used to re-connect or otherwise associate disconnected regions. Illustratively, joints or other applicable subject features can be determined from 2D images. Based on the spatial and/or logical relationship among the determined subject features, they can be grouped in an ordered fashion and/or mapped to corresponding subject(s). The grouping and/or mapping can be based on baseline information regarding the subject features (e.g., the wrist joint and shoulder joint must be connected via an elbow joint). In some embodiments, the controller can implement a Part Affinity Fields (PAFs)-based method to achieve the feature grouping and/or mapping. For example, FIG. 4A illustrates a 2D image of multiple subjects (e.g., two human dancers), and FIG. 4B illustrates subject features (e.g. joints) determined from the 2D image, as well as the grouping and mapping of subject features to individual subjects, in accordance with some embodiments of the presently disclosed technology. As illustrated in FIG. 4B, the grouping and mapping of subject features can distinguish the two subjects from each other, and thus avoid incorrectly mapping feature(s) of a first subject to a second subject. The controller can then project the subject features to the reference depth map and associate the primary region (e.g., that includes one or more features of a subject) with one or more secondary regions (e.g., each including one or more features of the same subject) in accordance with the subject feature grouping and/or mapping.

Because analyzing non-depth information may consume a considerable amount of computational resources, in some embodiments, the controller generates the collective region based on the distance between and/or the relative sizes of the primary region and other candidate regions. For example, the controller can select a threshold number of secondary regions that (1) have a size within the valid size range and (2) are located close enough to the primary region to be associated with the primary region. Once the collective region, including the primary and secondary regions, is constructed, other candidate regions can be filtered out or otherwise excluded from further processing.

At block 325, the method includes identifying at least a primary pose component (e.g., torso) and a secondary pose component (e.g., hand) of a same subject from the collective region. Illustratively, the controller analyzes a distribution of depth measurements using baseline information regarding the pose component(s).

Figure 5A:
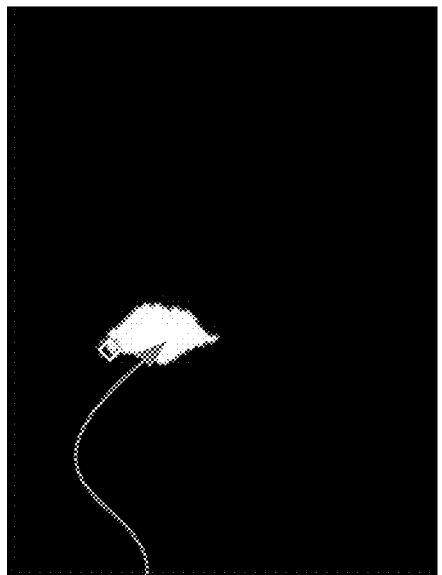
FIGS. 5A-5D illustrate a process for identifying a secondary pose component (e.g., hand) of a subject, in accordance with some embodiments of the presently disclosed technology.
Figure 5B:
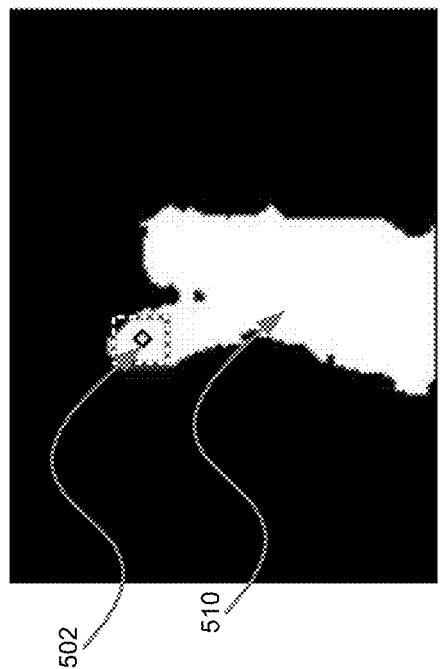

For example, FIGS. 5A-5D illustrate a process for identifying a secondary pose component (e.g., hand) of a subject (e.g., a human user), in accordance with some embodiments of the presently disclosed technology. For purposes of illustration, FIGS. 5A-5D do not show depth information (e.g., in grayscale). The baseline information regarding pose component(s) can indicate that a hand of a subject is likely to be a pose component that has a shortest distance to the mobile platform. Therefore, as illustrated in FIG. 5A, the controller can search for and identify a closest point 502 within the collective region 510. With reference to FIG. 5B, using the closest point as a seed point, the controller can identify a portion 504 of the collective region, for example, by applying a flood-fill method that is initiated at the closest point 502. Various other applicable methods can be employed to identify the portion 504 based on the closest point 502, and various depth thresholds or change-of-depth thresholds can be used therein. The identified portion 504 can include a hand of the subject and potentially other body part(s) (e.g., arm).

Figure 5C:
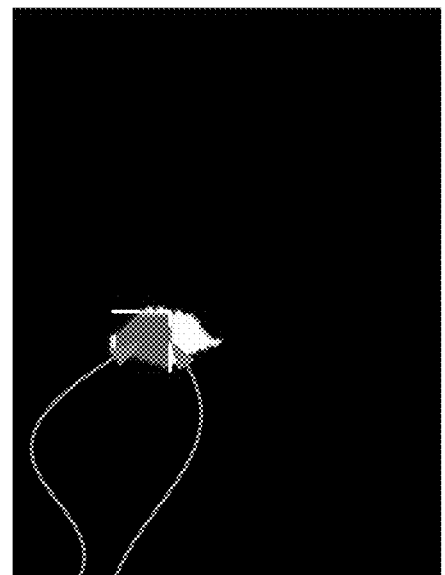

In some embodiments, the controller can divide or partition the reference depth map, in order to determine the secondary pose component in a more efficient and/or accurate manner. For example, a grid system can be used to further determine the hand of the subject within the identified portion 504. As illustrated in FIG. 5C, an example grid system 520 can divide the reference depth map into 9 grid blocks 531-539. The gridlines of the grid system 520 can be defined based on baseline information regarding the primary pose component (e.g., torso) or other pose components of the subject, and may themselves be non-uniform. For example, the upper horizontal gridline 522 can be located at a height of a torso centroid estimated from one or more previous frames of depth data; the lower horizontal gridline 524 can be located at a margin distance from the upper horizontal gridline 522; and the left and right vertical gridlines 526, 528 can be defined based on a torso width (with certain margin value) estimated from one or more previous frames of depth data.

Figure 5D:
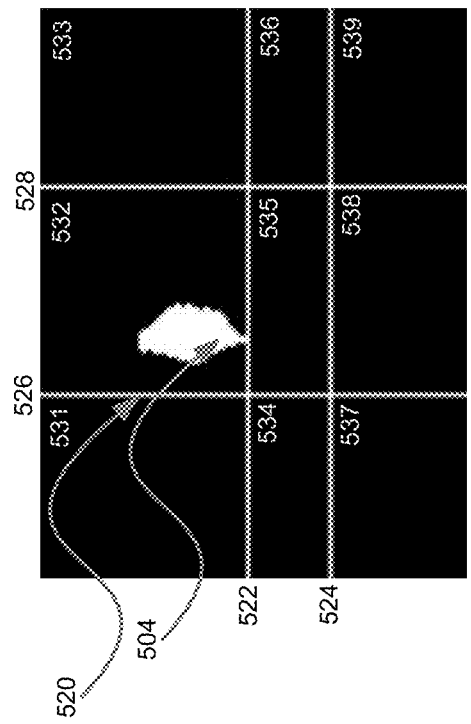

The gridlines form various grid blocks that can be processed individually (in sequence or in parallel) based on the grid block's location, size, or other attributes. Illustratively, the controller can scan the identified portion 504 in a direction or manner based on a location of the grid block the portion 504 falls into. For example, if the identified portion 504 falls into any of grid blocks 531-536 or 538, it is more likely that the hand of the subject is pointing upwards. Therefore, at least for purposes of computational efficiency, the controller can scan the identified portion 504, pixel row by pixel row, in an up-down direction. As another example, if the identified portion falls into either grid block 537 or 539, it is more likely that the hand of the subject is pointing left or pointing right. Therefore, the controller can scan the identified portion, pixel column by pixel column, in a left-right or right-left direction, respectively. As illustrated in FIG. 5D, an estimated boundary 542 of the hand can be located where an increase in depth between two or more adjacent pixel rows (or columns) exceeds a threshold. The set of scanned pixels 540 within the estimated hand boundary 542 can be identified as corresponding to a hand of the subject.

In some embodiments, the hand identification is further corroborated or revised based on 2D image data that corresponds to the reference depth map. For example, the hand boundaries can be revised based on texture and/or contrast analysis of the 2D image data. In some embodiments, the controller removes the identified first hand from the collective region and repeats the process of FIGS. 5A-5D to identify the second hand of the subject.

FIGS. 6A and 6B illustrate a process for identifying a primary pose component (e.g., torso) of the subject, in accordance with some embodiments of the presently disclosed technology. The collective region may include multiple pose components of the subject, non-pose components (e.g., head or legs in certain cases) of the subject, and/or objects other than the subject. Accordingly, the controller further processes the collective region to particularly identify the primary pose component. Illustratively, the controller can remove the identified secondary pose component(s) (e.g., hand(s)) and analyze the rest of the collective region 620. For example, the controller can efficiently identify the torso of the subject based on widths at various heights of the remaining collective region 620. As illustrated in FIG. 6A, the remaining collective region 620 can be examined line by line at different heights. The controller can compare widths of the collective region at different heights to a torso width range (e.g., between 2 and 6 times the width of the hand) and identify the subject's torso based thereon. With reference to FIG. 6A, an example line 602 indicates a width 604 that is outside the torso width range (e.g., smaller than twice of the hand width), while another example line 606 indicates a width 608 that falls within the torso width range. Accordingly, as illustrated in FIG. 6B, the controller identifies a larger rectangular area 610 as the torso of the subject. The area 610 excludes the upper half of the subject's head (where line 602 resides).

At block 330, the method includes determining a spatial relationship between at least the identified primary pose component and secondary pose component(s). The controller can determine one or more geometric attributes (e.g., the centroid, contour, shape, or the like) of the primary and/or secondary pose components. The controller can determine one or more vectors pointing between portions of the primary pose component and the secondary pose component(s). At block 335, the method includes generating one or more commands based on the determined spatial relationship. Illustratively, the determined geometric attributes and/or the vectors can be used to define a direction, speed, acceleration, and/or rotation, which serves as a basis for generating command(s) for controlling the mobile platform's next move(s). For example, the controller can generate a command that causes the mobile platform to stop moving when a user's hand is raised. As another example, the controller can generate a command that causes the mobile platform to move toward a point in space that resides on a line defined by the centroids of the identified torso and hand of the subject. In various embodiments, the method 300 can be implemented in response to obtaining each frame of depth data, in response to certain events (e.g., the mobile platform detecting presence of one or more subjects), and/or based on user commands.

Figure 7:
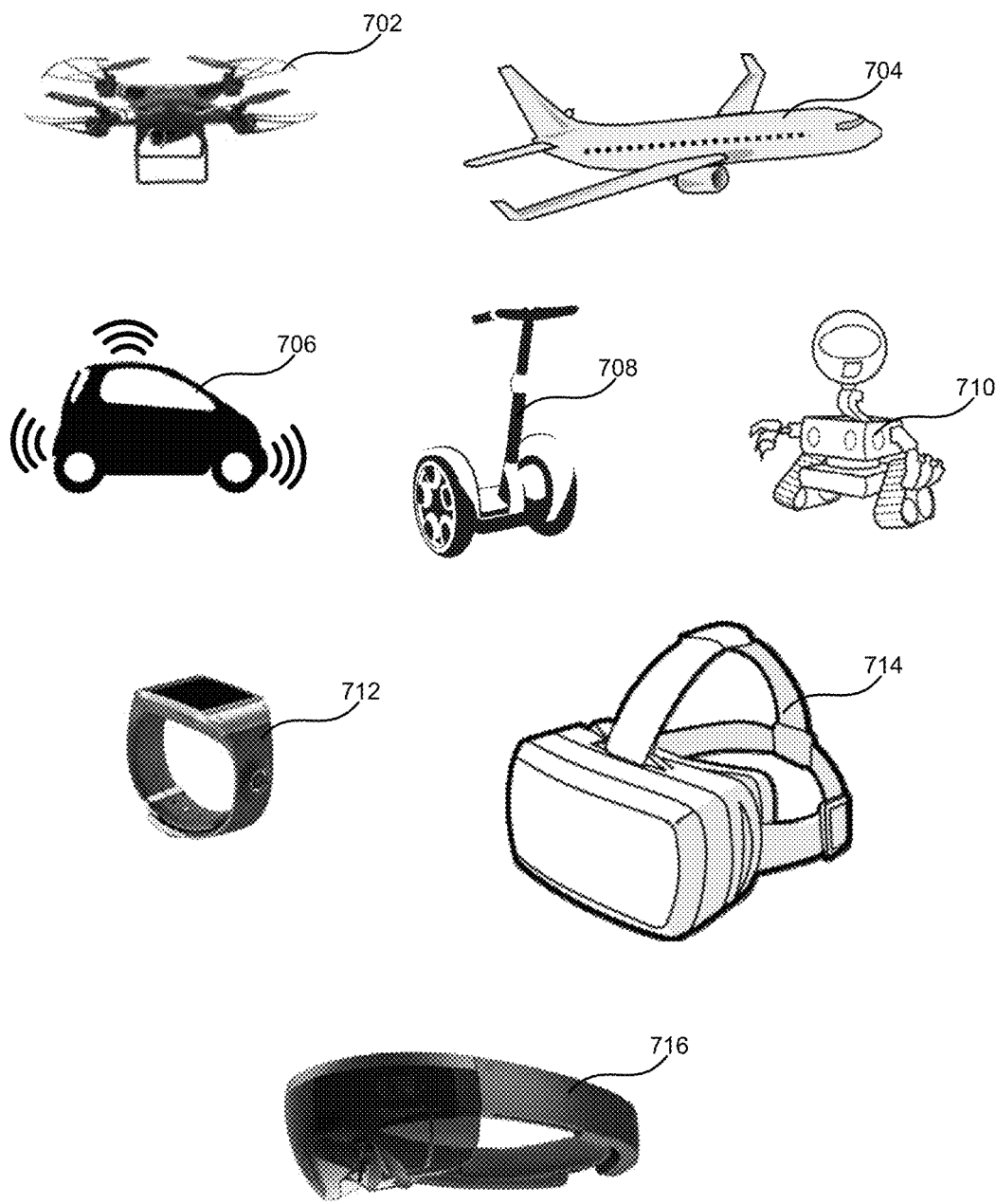
FIG. 7 illustrates examples of mobile platforms configured in accordance with various embodiments of the presently disclosed technology.

FIG. 7 illustrates examples of mobile platforms configured in accordance with various embodiments of the presently disclosed technology. As illustrated, a representative mobile platform as disclosed herein may include at least one of an unmanned aerial vehicle (UAV) 702, a manned aircraft 704, an autonomous car 706, a self-balancing vehicle 708, a terrestrial robot 710, a smart wearable device 712, a virtual reality (VR) head-mounted display 714, or an augmented reality (AR) head-mounted display 716.

Figure 8:
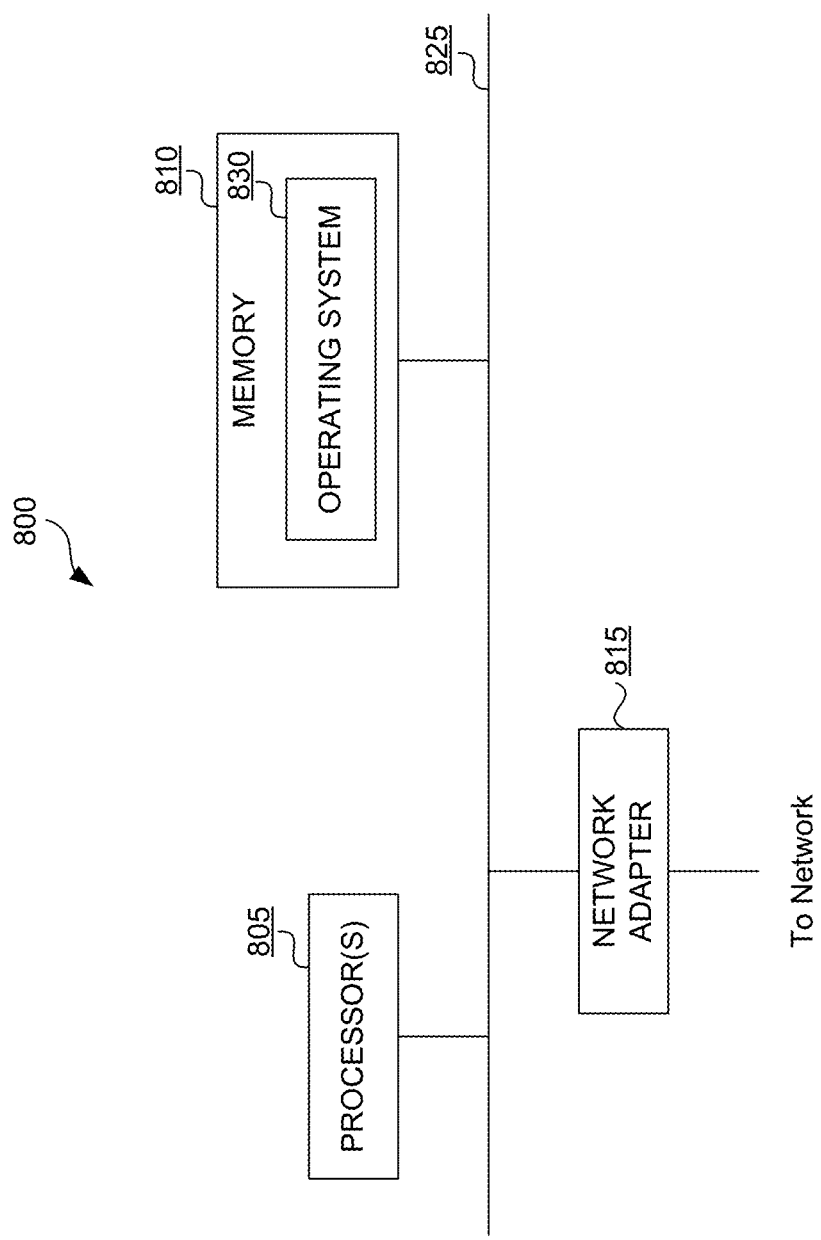
FIG. 8 is a block diagram illustrating an example of the architecture for a computer system or other control device that can be utilized to implement various portions of the presently disclosed technology.

FIG. 8 is a block diagram illustrating an example of the architecture for a computer system or other control device 800 that can be utilized to implement various portions of the presently disclosed technology. In FIG. 8, the computer system 800 includes one or more processors 805 and memory 810 connected via an interconnect 825. The interconnect 825 may represent any one or more separate physical buses, point to point connections, or both, connected by appropriate bridges, adapters, or controllers. The interconnect 825, therefore, may include, for example, a system bus, a Peripheral Component Interconnect (PCI) bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 805 may include central processing units (CPUs) to control the overall operation of, for example, the host computer. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 810 can be or include the main memory of the computer system. The memory 810 represents any suitable form of random access memory (RAM), read-only memory (ROM), flash memory, or the like, or a combination of such devices. In use, the memory 810 may contain, among other things, a set of machine instructions which, when executed by processor 805, causes the processor 805 to perform operations to implement embodiments of the presently disclosed technology.

Also connected to the processor(s) 805 through the interconnect 825 is a (optional) network adapter 815. The network adapter 815 provides the computer system 800 with the ability to communicate with remote devices, such as the storage clients, and/or other storage servers, and may be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. For example, some embodiments uses depth information generated from stereo camera(s), while other embodiments can use depth information generated from LiDAR(s), 3D-ToF, or RGB-D. Still further embodiments can use depth information generated from a combination of sensors.

To the extent any materials incorporated by reference herein conflict with the present disclosure, the present disclosure controls.

We claim:

1. A computer-implemented method for pose determination of a subject, comprising:
    identifying a plurality of candidate regions from current depth data representing an environment based, at least in part, on a depth connectivity criterion;
    determining a first region comprising a first subset of the plurality of candidate regions based, at least in part, on an estimation regarding a first pose component of the subject, the estimation regarding the first pose component of the subject including:
        determining a centroid point of a pose component corresponding to the first pose component and detected in prior depth data; and
        mapping the centroid point to the current depth data to estimate the first pose component in the current depth data and determine one of the plurality of candidate regions in the current depth data as the first region;
    determining a second region comprising a second subset of the plurality of candidate regions based, at least in part, on relative locations of the first region and the second region, including:
        generating a grid system for the current depth data, the grid system including a first grid block and a second grid block different from the first grid block; and
        determining the second region from the plurality of candidate regions based on the grid system;
    generating a collective region by associating the first region with the second region, wherein the first subset of the plurality of candidate regions and the second subset of the plurality of candidate regions are disconnected from one another;
    identifying the first pose component and a second pose component of the subject from the collective region;
    scanning the second pose component, including:
        in response to the identified second pose component being in the first grid block, scanning the identified second pose component pixel line by pixel line along a first direction; and
        in response to the identified second pose component being in the second grid block, scanning the identified second pose component pixel line by pixel line along a second direction different from the first direction;
    determining a spatial relationship between the identified first pose component and the scanned second pose component; and
    generating a controlling command based, at least in part, on the determined spatial relationship.

2. The method of claim 1, wherein the current depth data is obtained from images captured by a stereo camera, wherein the current depth data includes a depth map calculated based on a disparity map or intrinsic parameters of the stereo camera.

3. The method of claim 1, further comprising determining a depth range where the subject is likely to appear in the current depth data, wherein the plurality of candidate regions are identified based on the depth range.

4. The method of claim 1, wherein the current depth data includes at least one of unknown, invalid, or inaccurate depth information.

5. The method of claim 1, wherein the depth connectivity criterion includes at least one of a depth threshold or a change-of-depth threshold.

6. The method of claim 1, wherein the estimation regarding the first pose component of the subject further includes obtaining baseline information from the prior depth data, wherein the baseline information includes at least one of an estimated size or an estimated location of the first or second pose component.

7. The method of claim 1, wherein determining the second region is based, at least in part, on non-depth information representing the environment, wherein the non-depth information includes two-dimensional image data that corresponds to the current depth data.

8. The method of claim 1, wherein determining the second region is based on estimated locations of a plurality of joints of the subject.

9. The method of claim 1, wherein determining the spatial relationship between the identified first pose component and the identified second pose component comprises:
- determining one or more geometric attributes of at least one of the first pose component or the second pose component, wherein the one or more geometric attributes include at least one of a centroid location, contour, or shape of the at least one of the first pose component or the second pose component; or
- determining one or more vectors pointing between portions of the first pose component and the second pose component.

10. The method of claim 1, further comprising controlling a mobile platform based on the controlling command, wherein the mobile platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display.

11. A movable object, comprising:
a controller programmed to control the movable object, wherein the controller includes one or more processors configured to:
- identify a plurality of candidate regions from current depth data representing an environment based, at least in part, on a depth connectivity criterion;
- determine a first region comprising a first subset of the plurality of candidate regions based, at least in part, on an estimation regarding a first pose component of the subject, the estimation regarding the first pose component of the subject including:
  - determining a centroid point of a pose component corresponding to the first pose component and detected in prior depth data; and
  - mapping the centroid point to the current depth data to estimate the first pose component in the current depth data and determine one of the plurality of candidate regions in the current depth data as the first region;
- determine a second region comprising a second subset of the plurality of candidate regions based, at least in part, on relative locations of the first region and the second region, including:
  - generating a grid system for the current depth data, the grid system including a first grid block and a second grid block different from the first grid block; and
  - determining the second region from the plurality of candidate regions based on the grid system;
- generate a collective region by associating the first region with the second region, wherein the first subset of the plurality of candidate regions and the second subset of the plurality of candidate regions are disconnected from one another;
- identify the first pose component and a second pose component of the subject from the collective region;
- scan the second pose component, including:
  - in response to the identified second pose component being in the first grid block, scanning the identified second pose component pixel line by pixel line along a first direction; and
  - in response to the identified second pose component being in the second grid block, scanning the identified second pose component pixel line by pixel line along a second direction different from the first direction;
- determine a spatial relationship between the identified first pose component and the scanned second pose component; and
- generate a controlling command based, at least in part, on the determined spatial relationship.

12. The movable object of claim 11, further comprising:
a stereo camera, wherein the current depth data is obtained from images captured by the stereo camera, wherein the current depth data includes a depth map calculated based on a disparity map or intrinsic parameters of the stereo camera.

13. The movable object of claim 11, wherein the one or more processors are further configured to determine a depth range where the subject is likely to appear in the current depth data, wherein the plurality of candidate regions are identified based on the depth range.

14. The movable object of claim 11, wherein the current depth data includes at least one of unknown, invalid, or inaccurate depth information.

15. The movable object of claim 11, wherein the depth connectivity criterion includes at least one of a depth threshold or a change-of-depth threshold.

16. The movable object of claim 11, wherein determining the second region is based, at least in part, on non-depth information representing the environment or estimated location of a plurality of joints of the subject, wherein the non-depth information includes two-dimensional image data that corresponds to the current depth data.

17. The movable object of claim 11, wherein to determine the spatial relationship between the identified first pose component and the identified second pose component, the one or more processors are further configured to:
- determine one or more geometric attributes of at least one of the first pose component or the second pose component, wherein the one or more geometric attributes include at least one of a centroid location, contour, or shape of the at least one of the first pose component or the second pose component; or
- determine one or more vectors pointing between portions of the first pose component and the second pose component.

18. The movable object of claim 11, wherein the one or more processors are further configured to control a mobile platform based on the controlling command, wherein the mobile platform includes at least one of an unmanned aerial vehicle (UAV), a manned aircraft, an autonomous car, a self-balancing vehicle, a robot, a smart wearable device, a virtual reality (VR) head-mounted display, or an augmented reality (AR) head-mounted display.

19. A non-transitory computer-readable medium storing computer-executable instructions that, when executed, cause one or more processors associated with a mobile platform to perform actions, the actions comprising:
- identifying a plurality of candidate regions from current depth data representing an environment based, at least in part, on a depth connectivity criterion;
- determining a first region comprising a first subset of the plurality of candidate regions based, at least in part, on baseline information regarding a first pose component of the subject, the estimation regarding the first pose component of the subject including:
  - determining a centroid point of a pose component corresponding to the first pose component and detected in prior depth data; and
  - mapping the centroid point to the current depth data to estimate the first pose component in the current depth data and determine one of the plurality of candidate regions in the current depth data as the first region;
- determining a second region comprising a second subset of the plurality of candidate regions based, at least in part, on relative locations of the first region and the second region, including:
  - generating a grid system for the current depth data, the grid system including a first grid block and a second grid block different from the first grid block; and
  - determining the second region from the plurality of candidate regions based on the grid system;
- generating a collective region by associating the first region with the second region, wherein the first subset of the plurality of candidate regions and the second subset of the plurality of candidate regions are disconnected from one another;
- identifying the first pose component and a second pose component of the subject from the collective region;
- scanning the second pose component, including:
  - in response to the identified second pose component being in the first grid block, scanning the identified second pose component pixel line by pixel line along a first direction; and
  - in response to the identified second pose component being in the second grid block, scanning the identified second pose component pixel line by pixel line along a second direction different from the first direction;
- determining a spatial relationship between the identified first pose component and the scanned second pose component; and
- generating a controlling command based, at least in part, on the determined spatial relationship.

* * * * *